(12) United States Patent
Yoon et al.

(10) Patent No.: US 11,550,199 B2
(45) Date of Patent: Jan. 10, 2023

(54) APPARATUS HAVING VARIABLE TRANSMITTANCE

(71) Applicant: LG Chem, Ltd., Seoul (KR)

(72) Inventors: Young Sik Yoon, Daejeon (KR); Tae Gyun Kwon, Daejeon (KR); Moon Soo Park, Daejeon (KR)

(73) Assignee: LG Chem, Ltd.

( * ) Notice: Subject to any disclaimer, the term of this patent is extended or adjusted under 35 U.S.C. 154(b) by 386 days.

(21) Appl. No.: 16/760,732

(22) PCT Filed: Nov. 2, 2018

(86) PCT No.: PCT/KR2018/013268
§ 371 (c)(1),
(2) Date: Apr. 30, 2020

(87) PCT Pub. No.: WO2019/088767
PCT Pub. Date: May 9, 2019

(65) Prior Publication Data
US 2020/0348575 A1    Nov. 5, 2020

(30) Foreign Application Priority Data
Nov. 3, 2017 (KR) .................. 10-2017-0145700

(51) Int. Cl.
*G02F 1/1685* (2019.01)
*G02F 1/1676* (2019.01)
(Continued)

(52) U.S. Cl.
CPC .............. *G02F 1/1685* (2019.01); *E06B 9/24* (2013.01); *G02F 1/167* (2013.01); *G02F 1/1676* (2019.01);
(Continued)

(58) Field of Classification Search
CPC ...... G02F 1/1685; G02F 1/167; G02F 1/1676; G02F 1/165; G02F 1/1675
See application file for complete search history.

(56) References Cited

U.S. PATENT DOCUMENTS

2006/0023296 A1   2/2006  Whitesides et al.
2008/0136774 A1   6/2008  Harris et al.
(Continued)

FOREIGN PATENT DOCUMENTS

JP    2008-500592    *  1/2008  ............. G02B 26/00
JP    2008500592  A     1/2008
(Continued)

OTHER PUBLICATIONS

International Search Report for Application No. PCT/KR2018/013268 dated Feb. 12, 2019, 3 pages.

*Primary Examiner* — Joseph P Martinez
(74) *Attorney, Agent, or Firm* — Lerner, David, Littenberg, Krumholz & Mentlik, LLP

(57) ABSTRACT

A transmittance-variable device, a driving method thereof, a method for improving a light shielding ratio therein, and a use thereof are disclosed herein. In some embodiments, a transmittance-variable device includes a transmittance-variable film capable of switching between a transparent mode and a black mode depending on application of a voltage signal; and a power source for applying a voltage signal having a frequency of 30 Hz or less to implement the black mode, wherein the transmittance-variable film comprises a first electrode substrate, an electrophoretic layer, and a second electrode substrate sequentially arranged. The transmittance-variable device can exhibit an excellent light shielding ratio in the black mode after driving with a voltage signal, and such a transmittance-variable device can be usefully used in a smart window.

19 Claims, 4 Drawing Sheets

(51) Int. Cl.
    *E06B 9/24*         (2006.01)
    *G02F 1/167*      (2019.01)

(52) U.S. Cl.
    CPC ............... *E06B 2009/2417* (2013.01); *E06B 2009/2464* (2013.01); *G02F 2201/122* (2013.01)

(56) References Cited

U.S. PATENT DOCUMENTS

| | | |
|---|---|---|
| 2010/0177374 A1 | 7/2010 | Nam |
| 2016/0012762 A1 | 1/2016 | Joo et al. |
| 2017/0153525 A1 | 6/2017 | Lim et al. |

FOREIGN PATENT DOCUMENTS

| | | | | |
|---|---|---|---|---|
| JP | 2014186357 A | 10/2014 | | |
| KR | 20100083624 A | 7/2010 | | |
| KR | 101241306 B1 | 3/2013 | | |
| KR | 10-2015-0062240 | * 6/2015 | ............ | G02F 1/167 |
| KR | 20150062240 A | 6/2015 | | |
| KR | 10-1632712 | * 6/2016 | ............ | G09G 3/20 |
| KR | 101632712 B1 | 6/2016 | | |

\* cited by examiner

[Figure 1]
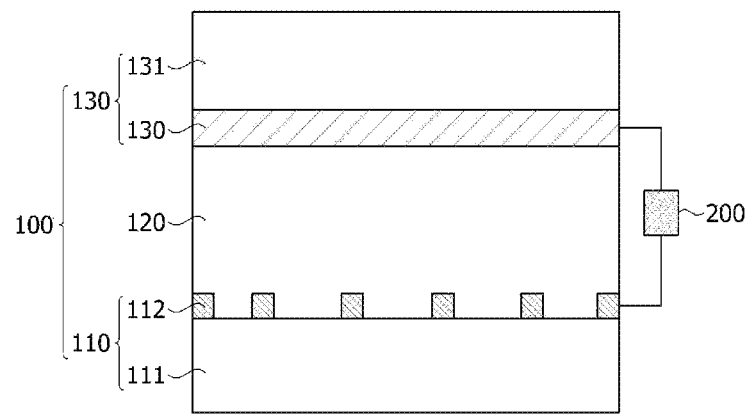
[Figure 2]
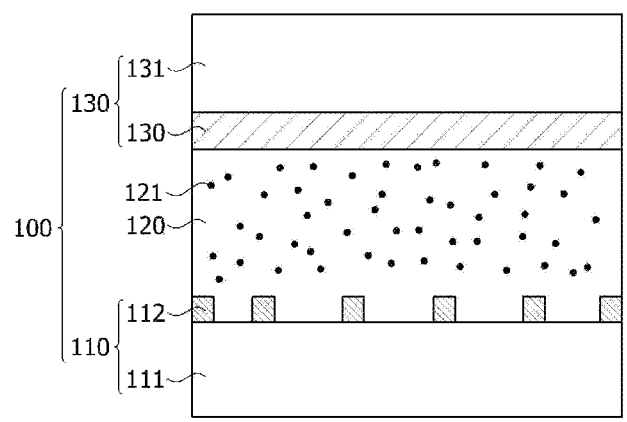
[Figure 3]
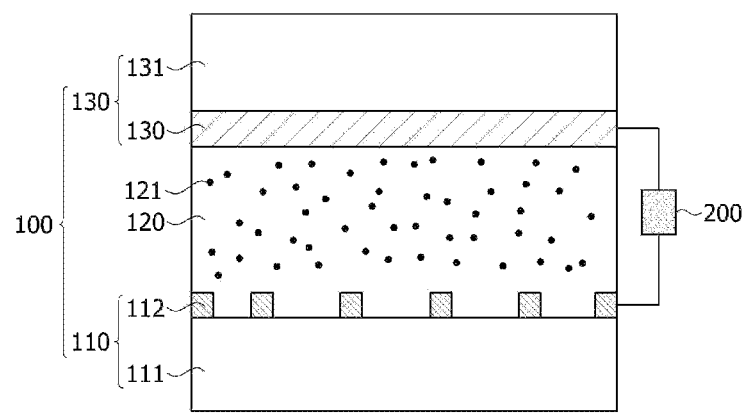

[Figure 4]
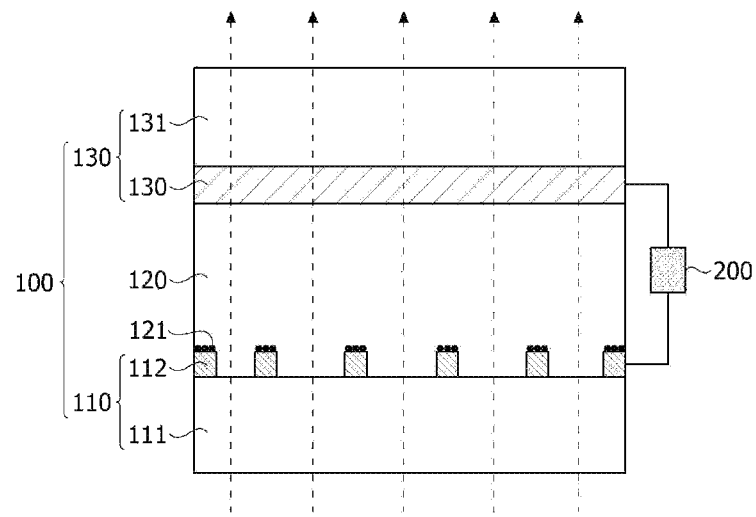
[Figure 5]
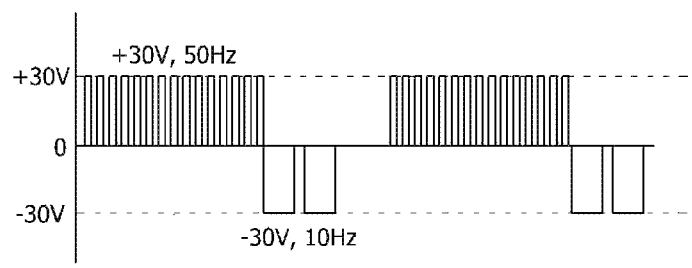
[Figure 6]
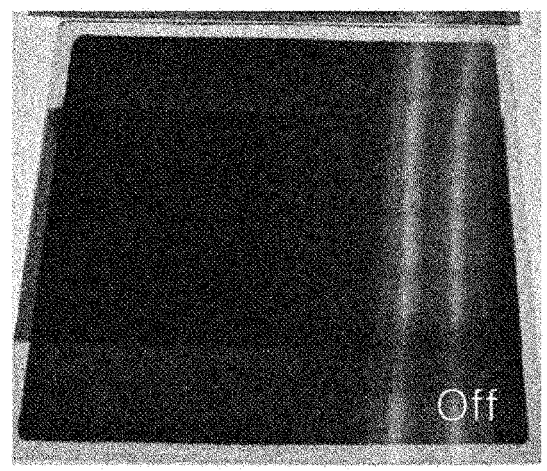

[Figure 7]
[Figure 8]
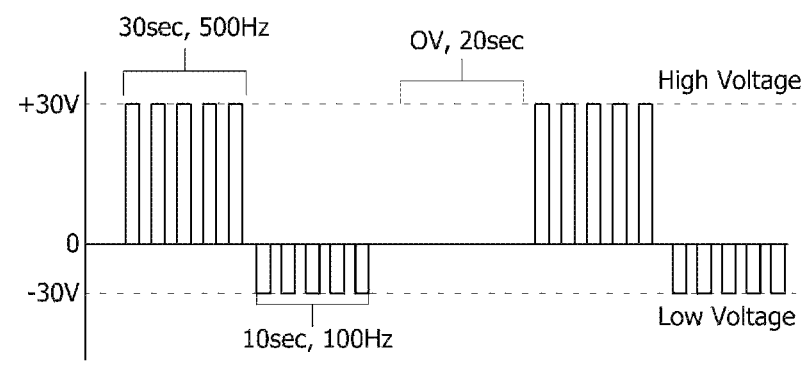

[Figure 9]
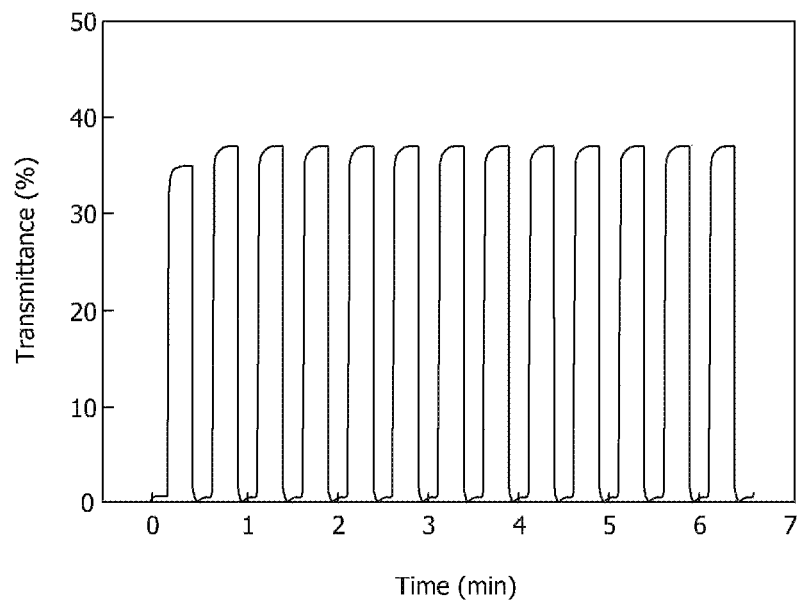
[Figure 10]
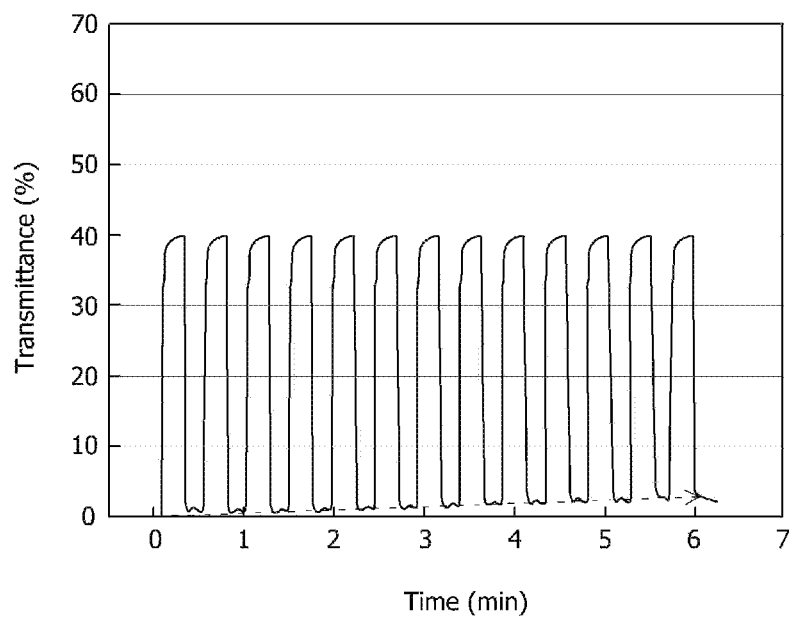

APPARATUS HAVING VARIABLE TRANSMITTANCE

CROSS-REFERENCE TO RELATED APPLICATION(S)

The present application is a National Phase entry under 35 U.S.C. § 371 of International Application No. PCT/KR2018/013268, filed on Nov. 2, 2018, which claims priority from Korean Patent Application No. 10-2017-0145700, filed on Nov. 3, 2017, the disclosures of which are incorporated by reference herein.

TECHNICAL FIELD

This disclosure relates to a transmittance-variable device, a driving method thereof, a method for improving a light shielding ratio, and a use thereof.

BACKGROUND ART

A transmittance-variable film may sequentially comprise a first electrode substrate on which an overall electrode layer is formed, an electrophoretic layer, and a second electrode substrate on which a pattern electrode layer is formed, where the electrophoretic layer may be equipped with charged particles in the form of particles capable of exhibiting an electrophoretic phenomenon by external force applied from the outside.

In Patent Document 1 (Korean Patent Publication No. 10-1241306), a negatively charged substance was used as charged particles and the charged particles existed in a state dispersed in the electrophoretic layer at the beginning without external force applied from the outside, and in the case of being irradiated with light between the patterns of the pattern electrode layer formed on the second electrode substrate, a black mode for blocking the light was implemented. At this time, the charged particles may be moved on the patterns of the pattern electrode layer by applying a positive voltage to the pattern electrode layer formed on the second electrode substrate and applying a negative voltage to the overall electrode layer formed on the first electrode substrate to realize a transparent mode that the light can be transmitted between the patterns of the pattern electrode layer. Thereafter, when a voltage is not applied to the pattern electrode layer or a negative voltage, which is the reverse voltage, is applied to the pattern electrode layer, the charged particles may be dispersed again to realize the black mode.

However, in the transmittance-variable film using such an electrophoretic phenomenon, due to the repetition of the pulse signal after driving, the dispersibility of the charged particles is lowered when the black mode is implemented, whereby there has been a problem that the light shielding ratio is significantly reduced as compared with the early black mode. Therefore, a transmittance-variable device is required to solve such a problem.

BRIEF DESCRIPTION OF DRAWINGS

FIG. 1 is a diagram illustratively showing a transmittance-variable device according to one example of the present disclosure.

FIG. 2 is a diagram illustratively showing a transmittance-variable device implementing an black mode before driving according to one example of the present disclosure.

FIG. 3 is a diagram illustratively showing a transmittance-variable device implementing a black mode after driving according to one example of the present disclosure.

FIG. 4 is a diagram illustratively showing a transmittance-variable device implementing a transparent mode after driving according to one example of the present disclosure.

FIG. 5 is a graph showing a voltage signal applied to the transmittance-variable device manufactured in Example 1 of the present disclosure.

FIG. 6 is an image of the transmittance-variable device manufactured in Example 1 of the present disclosure photographed in the black mode after driving.

FIG. 7 is an image of the transmittance-variable device manufactured in Example 1 of the present disclosure photographed in the transparent mode after driving.

FIG. 8 is a graph showing a voltage signal applied to the transmittance-variable device manufactured in Comparative Example 1 of the present disclosure.

FIG. 9 is a graph showing the transmittance of the transmittance-variable device manufactured in Example 1 of the present disclosure according to the voltage signal application.

FIG. 10 is a graph showing the transmittance of the transmittance-variable device manufactured in Comparative Example 3 of the present disclosure according to the voltage signal application.

EXPLANATION OF REFERENCE NUMERALS

100: transmittance-variable film
110: first electrode substrate
111: first base film
112: pattern electrode layer
120: electrophoresis layer
121: charged particles
130: second electrode substrate
131: second base film
132: overall electrode layer
200: power source

DISCLOSURE

Technical Problem

It is an object of the present disclosure to provide a transmittance-variable device capable of exhibiting an excellent light shielding ratio by applying a voltage signal having a low frequency upon implementation of a black mode, a driving method thereof, a method for improving a light shielding ratio, and a use thereof.

Technical Solution

The present disclosure relates to a transmittance-variable device. According to an exemplary transmittance-variable device of the present disclosure, it can exhibit an excellent light shielding ratio by applying a voltage signal having a low frequency from a power source to implement a black mode. In this specification, the term "voltage signal" means a voltage whose intensity, application time and frequency have each one specific value.

Hereinafter, the transmittance-variable device of the present disclosure will be described with reference to the accompanying drawings, where the attached drawings are illustrative and the transmittance-variable device of the present disclosure is not limited to the attached drawings.

FIG. 1 illustratively shows a transmittance-variable device according to one example of the present disclosure. As shown in FIG. 1, the transmittance-variable device comprises a transmittance-variable film (100) and a power source (200). The transmittance-variable film (100) comprises a first electrode substrate (110), an electrophoretic layer (120) and a second electrode substrate (130) sequentially.

The first electrode substrate (110) and the second electrode substrate (130) are portions, to which a voltage is applied from the power source (200), in order to realize an electrophoretic phenomenon of charged particles in the transmittance-variable film. In one example, any one of the first electrode substrate (110) and the second electrode substrate (130) may comprise a pattern electrode layer (112), and the other may comprise an overall electrode layer (132). Specifically, the first electrode substrate (110) may comprise a pattern electrode layer (112) formed on a first base film (111) and the second electrode substrate (130) may comprise an overall electrode layer (132) formed on a second base film (131).

In this specification, the pattern electrode layer means that the electrode is formed in a pattern shape, where the pattern shape can be appropriately selected in consideration of the object of the present disclosure. For example, the pattern shape may be a mesh shape, a stripe shape or a Voronoi shape.

Also, the overall electrode layer herein means that it is formed on the entire one surface of the base film.

As the first and second base films (111, 131), those having optical transparency can be used. For example, as the first and second base films (111, 131), an optically transparent plastic film or sheet can be used or glass can be used. Specifically, the plastic film or sheet can be exemplified by a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) or PP (polypropylene) film or sheet; a PVA (polyvinyl alcohol) film or sheet; a PES (poly ether sulfone) film or sheet; a PEEK (polyether ether ketone) film or sheet; a PEI (polyetherimide) film or sheet; a PEN (polyethylenenaphthatate) film or sheet; a polyester film or sheet such as a PET (polyethyleneterephtalate) film or sheet; a PI (polyimide) film or sheet; a PSF (polysulfone) film or sheet; a PAR (polyarylate) film or sheet; or a fluorine-based resin film or sheet, and the like, and generally, a cellulose film or sheet, a polyester film or sheet, or an acrylic film or sheet, and the like can be used, and preferably, a TAC film or sheet can be used, but it can be suitably selected in consideration of the purpose of the present disclosure.

As the pattern electrode layer (112) and the overall electrode layer (132), a transparent conductive layer may be used. For example, as the pattern electrode layer (112) and the overall electrode layer (132), those formed by depositing a conductive polymer, a conductive metal, a conductive nanowire or a metal oxide such as ITO (indium tin oxide), and the like may be used. Specifically, aluminum (Al) may be used as the pattern electrode layer (112), and indium tin oxide (ITO) may be used as the overall electrode layer (132).

The electrophoretic layer (120) is a portion that changes light transmittance by charged particles. Specifically, the light transmittance may be adjusted to express the desired color by an electrophoresis method in which charged particles are rotated or move closer to an electrode with different polarity depending on the voltage applied to the pattern electrode layer (112) and the overall electrode layer (132) existing in upper and lower parts of the electrophoretic layer (120).

In one example, the electrophoretic layer (120) may comprise a dispersion solvent and charged particles. As the charged particles, positively (+) or negatively (−) charged particles can be used. For example, one or more charged particles selected from the group consisting of carbon black, ferric oxides, chromium copper (CrCu) and aniline black can be used, and preferably, carbon black particles can be used. Furthermore, as the dispersion solvent for dispersing the charged particles, a known solvent such as a hydrocarbon-based solvent may be used without limitation. For example, as the hydrocarbon-based solvent, a common alkane solvent such as pentane, hexane, heptane, octane, nonane, decane, undecane, dodecane, or an isomer or mixture thereof may be used. In addition, as the dispersion solvent, an isoparaffinic solvent such as an alkane mixture substance having 6 to 13 carbon atoms may be used. For example, Isopar C, Isopar G, Isopar E (Exxon), ISOL-C(SK Chem) or ISOL-G (Exxon), and the like can be used as the isoparaffinic solvent.

The content of the charged particles in the electrophoretic layer may be 0.5 wt % to 5 wt %. When the content of the charged particles is within the above range, it may be advantageous in terms of providing a transmittance-variable device having excellent transmittance-variable characteristics.

The charged particles may be dispersed in the dispersion solvent to implement the black mode, and may move to the pattern electrode (112) to implement the transparent mode. For example, as shown in FIG. 2, the transmittance-variable film (100) may be implemented in the black mode, as the charged particles (121) in the electrophoretic layer (120) are dispersed in an initial state, that is, at 0 V where a voltage signal is not applied to the overall electrode (132) and the pattern electrode (112) existing on the upper and lower parts of the electrophoretic layer (120). Also, as shown in FIG. 3, when the charged particles (121) bear negative charges, a negative voltage is applied to the pattern electrode layer (112) and the overall electrode layer (132) existing on the upper and lower parts of the electrophoretic layer (120), the repulsive force acts between the charged particles (121) and the pattern electrode layer (112) and the overall electrode layer (132), so that the charged particles are dispersed in the electrophoretic layer (120), whereby the transmittance-variable film (100) may implement the black mode. At this time, as shown in FIG. 4, when the transmittance-variable film (100) applies a positive voltage to the pattern electrode layer (112), the repulsive force acts between the charged particles (121) and the overall electrode layer (132), and the attractive force acts between the charged particles (121) and the pattern electrode layer (112), so that the charged particles (121) move to the pattern electrode layer (112), whereby transparent mode can be implemented.

As described above, the transmittance-variable film (100) switches the transparent mode and the black mode depending on application of a voltage signal.

The power source (200) is a device for supplying the transmittance-variable film (100) with a voltage applied to vary the transmittance. The power source (200) may apply a voltage signal having a frequency of 30 Hz or less to implement the black mode. Specifically, the voltage signal may have a frequency of 25 Hz or less, 20 Hz or less, 15 Hz or less, and preferably 10 Hz or less, where the lower limit of the frequency may be 1 Hz or more within the above-described range. The transmittance-variable film (100) can exhibit an excellent light shielding ratio in the black mode after driving by applying a voltage signal from the power source (200) at a frequency within the above-described range.

The power source (200) may apply a square-wave voltage signal. Specifically, the power source (200) applies a direct voltage in order to maintain the transparent mode or the black mode of the transmittance-variable film (100) and applies an alternating voltage when switching the transparent mode and the black mode, so that the waveform of the voltage signal can represent a quadrangle.

The power source (200) may apply a voltage signal having a voltage intensity of −5 V to −40 V in the black mode, but may be suitably selected within the above-described range in consideration of the purpose of the present disclosure. For example, in the power source (200), the voltage intensity of the voltage signal applied when the transmittance-variable film (100) is implemented in the black mode, may be −10 V to −40 V, −15 V to −40 V, −20 V to −40 V, −25 V to −40 V, or −25 V to −35 V. The transmittance-variable film (100) can switch from the transparent mode to the black mode when a reverse voltage signal of the intensity of the voltage within the above-described range is applied from the power source (200) to implement the black mode.

The application time of the voltage signal in the power source (200) may be suitably selected in order to maintain the time of the desired black mode at the time of implementation of the black mode. For example, the application time of the voltage signal may be 0.1 seconds to 5 seconds. Specifically, the application time of the voltage signal may be 0.5 seconds to 4.5 seconds, 1 second to 4 seconds, 1.5 seconds to 3.5 seconds, or 2 seconds to 3 seconds.

The power source (200) may maintain 0 V after application of a voltage signal to implement the black mode. Specifically, by maintaining the voltage signal for implementation of the black mode from the power source (200) at 0 V, that is, a stage where no voltage signal is applied, for 0.5 seconds to 5 seconds, dispersibility of the charged particles can be maximized.

The power source (200) may apply a voltage signal having a frequency of 300 Hz or more to implement the transparent mode. Specifically, the frequency may be 350 Hz or more, 400 Hz or more, or 450 Hz or more to implement the transparent mode, and the upper limit of the frequency may be 550 Hz when to implement the transparent mode. As the power source (200) applies a voltage signal having a frequency in the above-described range to implement the transparent mode of the transmittance-variable film (100), it may be switched from the black mode to the transparent mode again after driving.

In one example, the power source (200) may have a frequency to implement the transparent mode larger than a frequency to implement the black mode. For example, the difference between the frequency to implement the transparent mode and the frequency to implement the black mode after driving may be more than 250 Hz to less than 650 Hz, and specifically, may be 300 Hz to 600 Hz, 350 Hz to 550 Hz, 400 Hz to 500 Hz, more than 450 Hz to 500 Hz, or more than 450 Hz to 490 Hz. The higher the frequency, it is more similar to the case where a constant voltage is applied continuously, so that the charged particles can be attracted to the pattern electrode layer quickly and strongly by applying a high frequency to implement the transparent mode. On the contrary, the lower the frequency, it is more similar to the case where the voltage is cut off, that is, the pulse voltage is applied, so that it may be advantageous to disperse the charged particles moved to the pattern electrode layer to implement the transparent mode in their original state by applying a low frequency to implement the black mode. Therefore, the dispersibility of the charged particles is improved, so that the low transmittance can be exhibited upon implementation of the black mode.

The power source (200) may apply a voltage signal having a voltage intensity of 5 V to 50 V, which can be appropriately selected from reverse voltage signals of the voltage signals applied to implement the black mode of the transmittance-variable film (100) after driving. For example, in the power source (200), the voltage intensity of the voltage signal applied to implement the transparent mode of the transmittance-variable film (100) may be 10 V to 40 V, 15 V to 40 V, 20 V to 40 V, 25V to 40V or 25V to 35V. The transparent mode may be implemented by applying the voltage signal at the voltage intensity within the above-described range at the time of the transparent mode implementation.

In one example, in the power source (200), the difference between the absolute value of the voltage to implement the transparent mode and the absolute value of the voltage to implement the black mode may be less than 10 V, but the difference in the absolute values can be appropriately selected in consideration of the purpose of the present disclosure.

The application time of the voltage signal in the power source (200) may be appropriately selected in order to maintain the time of the desired transparent mode. For example, the application time of the voltage signal to implement the transparent mode may be 0.1 seconds to 10 seconds. Specifically, the application time of the voltage signal may be 1 second to 10 seconds, 3 seconds to 10 seconds, 5 seconds to 10 seconds, or 8 seconds to 10 seconds.

The transmittance-variable film (100) may satisfy Equation 1 below.

$$T_{DAB} - T_{DBB} \leq 2 \qquad \text{[Equation 1]}$$

In Equation 1 above, $T_{DAB}$ is the transmittance in the black mode after driving with a voltage signal, and $T_{DBB}$ is the transmittance in the black mode before driving with a voltage signal.

Specifically, in the transmittance-variable film (100), the upper limit of the difference between the transmittance in the black mode after driving and the transmittance in the black mode before driving may be 1.8 or less, 1.6 or less, or 1.4 or less, and the lower limit may be more than 0, 0.2% or more, 0.4% or more, or 0.5% or more. As the difference between the transmittance in the black mode after driving and the transmittance in the black mode before driving satisfies Equation 1 above, the transmittance-variable film (100) can be implemented in the black mode having an excellent light shielding ratio that the transmittance in the black mode after driving shows a numerical value similar to the transmittance in the black mode before driving.

Specifically, the transmittance-variable film (100) may have the transmittance in the black mode before driving of less than 3%, and more specifically, 2% or less, 1% or less, 0.5% or less, or 0.3% or less. The lower limit of the transmittance may be, for example, 0.1% or more. The transmittance-variable film (100) may be implemented in the black mode having a light shielding ratio of more than 97%, 98% or more, 99% or more, or 99.5% or more, by having the early transmittance within the above-described range.

In addition, as described above, the transmittance-variable film (100) may have the transmittance in the black mode after driving of less than 3% by applying a voltage signal from the power source (200). Specifically, the transmittance in the black mode after driving of the transmittance-variable film (100) may be 2.5% or less, 2% or less, or 1.5% or less. The lower limit may be, for example, 0.1% or more, or 0.5% or more. The transmittance-variable film (100) may be implemented in the black mode having an excellent light shielding ratio of more than 97% after driving, by having the transmittance in the above-described range.

Furthermore, as described above, the transmittance-variable film (100) may have the transmittance in the transparent mode after driving of 20% or more by applying a voltage signal from the power source (200). Specifically, the transmittance-variable film (100) may have the transmittance in the transparent mode after driving of 25% or more, or 35% or more. The upper limit of the transmittance may be, for example, 80% or less, 70% or less, 60% or less, 50% or less, or 40% or less. The transmittance-variable film (100) may be switched from the black mode to the transparent mode again after driving, by having the transmittance within the above-described range.

The present disclosure also relates to a method of driving a transmittance-variable device. For example, the driving method of the transmittance-variable device relates to a method of driving the transmittance-variable device through the above-described transmittance-variable device. Therefore, the contents described in the transmittance-variable device can be equally to details of the driving method of the transmittance-variable device to be described below.

An exemplary method of driving a transmittance-variable device of the present disclosure comprises applying a voltage signal having a frequency of 30 Hz or less to a transmittance-variable film of a transmittance-variable device, which comprises a first electrode substrate, an electrophoretic layer and a second electrode substrate sequentially and switches between a transparent mode and a black mode depending on the applied voltage, to implement the black mode. The details of the transmittance-variable film and the application of a voltage signal are the same as those described in the transmittance-variable device, and thus will be omitted. As the transmittance-variable device is driven through the above-described method, it can implement the black mode of the transmittance-variable film having an excellent light shielding ratio.

The present disclosure also relates to a method for improving a light shielding ratio of a transmittance-variable device. For example, the improvement method of the transmittance-variable device relates to a method for improving a light shielding ratio of the transmittance-variable device through the above-described transmittance-variable device. Therefore, the contents described in the transmittance-variable device can be equally applied to details of the method for improving a light shielding ratio of a transmittance-variable device to be described below.

An exemplary method for improving a light shielding ratio of a transmittance-variable device of the present disclosure comprises applying a voltage signal having a frequency of 30 Hz or less to a transmittance-variable film, which comprises a first electrode substrate, an electrophoretic layer and a second electrode substrate sequentially and switches between a transparent mode and a black mode depending on the applied voltage, to implement the black mode. The details of the transmittance-variable film and the application of a voltage signal are the same as those described in the transmittance-variable device, and thus will be omitted. As the transmittance-variable device improves the light shielding ratio through the above method, it can implement the black mode of the transmittance-variable film having an excellent light shielding ratio after driving.

The present disclosure also relates to a use of the transmittance-variable device. The transmittance-variable device of the present disclosure can switch between the transparent mode and the black mode depending on the applied voltage, and have an excellent light shielding ratio in the black mode after driving. Such a transmittance-variable device can be applied, for example, to a smart window. In this specification, the term "smart window" means a window having a function of controlling the transmittance of incident light, for example, sunlight, which is a concept that encompasses functional elements named a so-called smart blind, electronic curtain, transmittance-variable glass or dimming glass, and the like. The method of constructing such a smart window is not particularly limited, and a conventional method may be applied as long as the transmittance-variable device is included.

Advantageous Effects

The transmittance-variable device of the present disclosure can exhibit an excellent light shielding ratio in the black mode after driving with a voltage signal, and such a transmittance-variable device can be usefully used in a smart window.

BEST MODE

Hereinafter, the present disclosure will be specifically described by way of the examples, but the scope of the present disclosure is not limited by the following examples.

Example 1

Preparation of Composition for Electrophoretic Layer

A composition for an electrophoretic layer was prepared by dispersing 3.5 wt % of carbon black having a particle diameter of 200 nm in a non-polar hydrocarbon solvent (Isopar G, EXXONMOBIL CHEMICAL).

Production of First Electrode Substrate

A first electrode substrate was produced by forming an Al metal mesh on a polyethylene terephthalate film (width×length=100 mm×100 mm) through reverse offset printing to have a line width in the range of 3 μm, an average pitch of 50 μm and a thickness of 145 nm.

Production of Second Electrode Substrate

A second electrode substrate was produced by forming an ITO electrode on the entire surface of a polyethylene terephthalate film (width×length=100 mm×100 mm) to have a thickness of 100 nm using a sputtering method.

Production of Transmittance-Variable Film

After applying the composition for an electrophoretic layer on the Al metal mesh of the first electrode substrate, the second electrode substrate was laminated so that the ITO electrode of the second electrode substrate was in contact with the composition for an electrophoretic layer to produce a transmittance-variable film.

Manufacturing of Transmittance-Variable Device

A transmittance-variable device was manufactured by connecting an NF programmable AC/DC power source EC1000S (NF Corporation) as a power source to the transmittance-variable film produced in the above such that the (+) voltage was applied to the first electrode formed on the first electrode substrate and the (−) voltage was applied to the second electrode formed on the second electrode substrate. FIG. 5 is a graph showing a voltage signal applied to the transmittance-variable device manufactured in Example 1 of the present disclosure. As shown in FIG. 5, in the transmittance-variable film, a voltage signal having an intensity of −30 V was applied to the electrophoretic layer at a frequency of 10 Hz for 2 seconds, whereby the black mode was implemented as shown in FIG. 6. Thereafter, as shown in FIG. 5, in order to maintain the transmittance-variable film in the black mode, it was held for 2 seconds in a state of no voltage application (0 V). Thereafter, as shown in FIG. 5, in the transmittance-variable film, a voltage of 30 V was applied to the electrophoretic layer at a frequency of 500 Hz for 10 seconds, whereby the transparent mode was implemented as shown in FIG. 7.

Example 2

A transmittance-variable device was manufactured in the same manner as in Example 1 above, except that in order to implement the transmittance-variable film in the black mode, the voltage signal having an intensity of −30 V was applied to the electrophoretic layer at a frequency of 30 Hz.

Example 3

A transmittance-variable device was manufactured in the same manner as in Example 1, except that in order to implement the transmittance-variable film in the black mode, the voltage signal having an intensity of −10 V was applied to the electrophoretic layer at a frequency of 10 Hz.

Comparative Example 1

As shown in FIG. 8, a transmittance-variable device was manufactured in the same manner as in Example 1 above, except that in order to implement the transmittance-variable film in the black mode, the voltage signal having an intensity of −10 V was applied to the electrophoretic layer at a frequency 100 Hz for 10 seconds.

Comparative Example 2

A transmittance-variable device was manufactured in the same manner as in Example 1 above, except that in order to implement the transmittance-variable film in the black mode, the voltage signal having an intensity of −30 V was applied to the electrophoretic layer at a frequency of 50 Hz.

Comparative Example 3

A transmittance-variable device was manufactured in the same manner as in Example 1 above, except that in order to implement the transmittance-variable film in the black mode, the voltage signal having an intensity of −30 V was applied to the electrophoretic layer at a frequency of 100 Hz.

Evaluation Example. Evaluation of Transmittance According to Frequency of Voltage Signal Through the transmittance-variable devices of Examples and Comparative Examples above, the transmittance of the transmittance-variable films implemented at the time of switching between the transparent mode and the black mode was measured as transmittance changes for visible light before and after voltage application using an electro-optic instrument (LCMS-200, Sesim Photonics Technology) and the results were represented in Table 1 below.

TABLE 1

| | Black Mode before Driving (0 V) | Transparent Mode after Driving | Black Mode after Driving |
|---|---|---|---|
| Example 1 | 0.2% | 37% | 0.7% |
| Example 2 | 0.2% | 37% | 1% |
| Example 3 | 0.2% | 27% | 1.5% |
| Comparative Example 1 | 0.2% | 27% | 4% |
| Comparative Example 2 | 0.2% | 37% | 3% |
| Comparative Example 3 | 0.2% | 39% | 3.5% |

As shown in Table 1, it can be confirmed, as in the transmittance-variable devices of Examples 1 to 3, that if the frequency of the voltage signal applied to the electrophoretic layer is controlled to 30 Hz or less upon implementation of the transmittance-variable film from the transparent mode to the black mode, it decreases as compared to the transmittance in the black mode before driving, that is, the black mode upon no voltage application (0 V). In particular, in the case of the transmittance-variable device of Example 1, as shown in FIG. 9, it can be confirmed that the transmittance in the black mode after driving is 0.7%, that is, the light shielding ratio is 99.3%. On the other hand, it can be confirmed, as in the transmittance-variable devices of Comparative Examples 1 to 3, that if the frequency of the voltage applied to the electrophoretic layer is controlled to more than 30 Hz upon implementation of the transmittance-variable film from the transparent mode to the black mode, it increases as compared to the transmittance in the black mode before driving. In particular, in the case of the transmittance-variable device of Comparative Example 3, as shown in FIG. 10, it can be confirmed that the transmittance in the black mode after driving is 3.5%, that is, the light shielding ratio is 96.5%.

Therefore, it was confirmed that when the transmittance-variable devices of Examples 1 to 3 were used, the light shielding ratio in the black mode after driving was superior to that of the transmittance-variable devices of Comparative Examples 1 to 3.

The invention claimed is:

1. A transmittance-variable device, comprising:
    a transmittance-variable film capable of switching between a transparent mode and a black mode by application of a voltage signal; and
    a power source for applying a positive voltage signal and a negative voltage signal,
    wherein the transparent mode is implemented by applying and maintaining the positive voltage signal, and
    wherein the black mode is implemented by applying and maintaining a negative voltage signal, wherein the negative voltage signal has a frequency of 30 Hz or less,
    wherein the transmittance-variable film comprises:
    a first electrode substrate, an electrophoretic layer, and a second electrode substrate sequentially arranged.

2. The transmittance-variable device according to claim 1, wherein the first electrode substrate comprises a pattern electrode layer and the second electrode substrate comprises an overall electrode layer.

3. The transmittance-variable device according to claim 2, wherein the electrophoretic layer comprises a dispersion solvent and charged particles.

4. The transmittance-variable device according to claim 3, wherein the charged particles comprise one or more particles selected from the group consisting of carbon black, ferric oxides, chromium copper (CrCu) and aniline black.

5. The transmittance-variable device according to claim 3, wherein the charged particles are dispersed in the dispersion solvent to implement the black mode, and wherein the charged particles move to the pattern electrode layer to implement the transparent mode.

6. The transmittance-variable device according to claim 1, wherein the positive voltage signal and the negative voltage signal are each a square-wave voltage signal.

7. The transmittance-variable device according to claim 1, wherein the negative voltage signal is a square-wave voltage signal having a voltage intensity of 0 V or −5 V to −40 V and is applied for 0.1 seconds to 5 seconds to implement the black mode.

8. The transmittance-variable device according to claim 7, wherein the negative voltage signal is applied for of 1 second to 5 seconds to implement the black mode.

9. The transmittance-variable device according to claim 7, wherein the power source maintains 0 V after application of the negative voltage signal to implement the black mode.

10. The transmittance-variable device according to claim 1, wherein the negative voltage signal has a frequency of 10 Hz or less.

11. The transmittance-variable device according to claim 1, wherein the positive voltage signal has a frequency of 300 Hz or more to implement the transparent mode.

12. The transmittance-variable device according to claim 1, wherein the power source applies the positive voltage signal having a first frequency to implement the transparent mode, and applies the negative voltage signal having a second frequency to implement the black mode,
wherein the first frequency is larger than the second frequency.

13. The transmittance-variable device according to claim 11, wherein the positive voltage signal has a voltage intensity of 5 V to 50 V to implement the transparent mode.

14. The transmittance-variable device according to claim 11, wherein the positive voltage signal is applied for 0.1 seconds to 10 seconds to implement the transparent mode.

15. The transmission variable device according to claim 1, wherein the transmittance-variable film satisfies Equation 1 below:

$$T_{DAB} - T_{DBB} \leq 2 \qquad \text{[Equation 1]}$$

wherein, $T_{DAB}$ is the transmittance in the black mode after driving with the voltage signal, and $T_{DBB}$ is the transmittance in the black mode before driving with the voltage signal.

16. The transmittance-variable device according to claim 1, wherein the transmittance-variable film has transmittance of less than 3% in the black mode after driving with a the negative voltage signal and transmittance of 20% or more in the transmittance mode after driving with the positive voltage signal.

17. A method of driving a transmittance-variable device, comprising:
applying a negative voltage signal having a voltage frequency of 30 Hz or less to a transmittance-variable film of a transmittance-variable device to implement a black mode,
wherein the transmittance-variable device is capable of switching between a transparent mode and the black mode based on application of a voltage signal,
wherein the transparent mode is implemented by applying and maintaining a positive voltage signal, and
wherein the transmittance-variable film comprises a first electrode substrate, an electrophoretic layer and a second electrode substrate sequentially arranged.

18. A method for improving a light shielding ratio of a transmittance-variable device, comprising:
applying a negative voltage signal having a voltage frequency of 30 Hz or less to a transmittance-variable film of a transmittance-variable device to implement a black mode,
wherein the transmittance-variable device is capable of switching between a transparent mode and the black mode based on application of a voltage signal,
wherein the transparent mode is implemented by applying and maintaining a positive voltage signal, and
wherein the transmittance-variable film comprises a first electrode substrate, an electrophoretic layer and a second electrode substrate sequentially arranged.

19. A smart window comprising the transmittance-variable device of claim 1.

* * * * *